（12） United States Patent
Marcos Pastor et al.

(10) Patent No.: US 12,272,975 B2
(45) Date of Patent: Apr. 8, 2025

(54) METHOD AND SYSTEM FOR PROTECTING ON-BOARD BATTERY CHARGER AGAINST TRANSITORY DISCONNECTIONS IN HIGH-VOLTAGE NETWORK

(71) Applicant: LEAR CORPORATION, Southfield, MI (US)

(72) Inventors: Adria Marcos Pastor, Valls (ES); Antonio Martinez Perez, Valls (ES); Sergio Martinez Porras, Valls (ES)

(73) Assignee: LEAR CORPORATION, Southfield, MI (US)

( * ) Notice: Subject to any disclaimer, the term of this patent is extended or adjusted under 35 U.S.C. 154(b) by 617 days.

(21) Appl. No.: 17/583,287

(22) Filed: Jan. 25, 2022

(65) Prior Publication Data

US 2023/0238805 A1 Jul. 27, 2023

(51) Int. Cl.
*H02J 7/00* (2006.01)
*B60L 53/20* (2019.01)
*B60L 53/60* (2019.01)

(52) U.S. Cl.
CPC .......... *H02J 7/00308* (2020.01); *B60L 53/20* (2019.02); *B60L 53/60* (2019.02); *H02J 7/00309* (2020.01); *B60L 2210/10* (2013.01); *B60L 2240/525* (2013.01); *B60L 2240/547* (2013.01); *H02J 2207/20* (2020.01)

(58) Field of Classification Search
USPC ....................................................... 320/104
See application file for complete search history.

(56) References Cited

U.S. PATENT DOCUMENTS

| | | | |
|---|---|---|---|
| 6,204,630 B1* | 3/2001 | James | H02M 1/4225 320/104 |
| 2009/0278547 A1 | 11/2009 | Acena et al. | |
| 2013/0054085 A1 | 2/2013 | Casey | |
| 2014/0354295 A1* | 12/2014 | Magnusson | B60L 3/04 324/538 |
| 2017/0259669 A1 | 9/2017 | Eckert et al. | |
| 2020/0180438 A1 | 6/2020 | Shin et al. | |

* cited by examiner

*Primary Examiner* — Samuel Berhanu
(74) *Attorney, Agent, or Firm* — Brooks Kushman P.C.

(57) ABSTRACT

An on-board battery charger (OBC) includes a converter (e.g., a DC/DC converter) and a controller. An output port of the converter is connectable to a battery (e.g., a traction battery of an electric vehicle (EV)) via a voltage network (e.g., a high-voltage (HV) network of the EV). The converter converts an input power into an output power and outputs the output power onto the voltage network for charging the battery. The controller, upon detecting a transitory disconnection in the voltage network, controls the converter to stop converting the input power into the output power. In stopping the converter, the controller stops the converter prior to a corresponding reconnection in the voltage network. The controller may detect the transitory disconnection upon detecting a switching frequency of a power switch of the converter decreasing below a pre-defined threshold as the switching frequency decreases due to effects of the transitory disconnection.

20 Claims, 6 Drawing Sheets

METHOD AND SYSTEM FOR PROTECTING ON-BOARD BATTERY CHARGER AGAINST TRANSITORY DISCONNECTIONS IN HIGH-VOLTAGE NETWORK

TECHNICAL FIELD

The present invention relates to methods and systems for controlling an on-board battery charger of an electric vehicle.

BACKGROUND

An on-board battery charger (OBC) of an electric vehicle (EV) is used for charging a traction battery of the EV. The OBC converts electrical power absorbed from an AC power source into DC electrical power and charges the traction battery with the DC electrical power.

SUMMARY

An object includes controlling an on-board battery charger (OBC), connected via a high-voltage (HV) network to a traction battery of an electric vehicle (EV), so that upon a transitory disconnection in the HV network while the OBC is charging the traction battery via the HV network, the operation of the OBC is stopped prior to a corresponding reconnection in the HV network.

In carrying out at least one of the above and/or other objects, an OBC is provided. The OBC includes a converter and a controller. The converter has an output port connectable to a battery via a voltage network. The converter is operable for converting an input power into an output power and for outputting the output power at the output port onto the voltage network for charging the battery. The controller is operable to, upon detecting a transitory disconnection in the voltage network, control the converter to stop converting the input power into the output power.

In controlling the converter to stop converting the input power into the output power, the controller stops operation of the converter prior to a corresponding reconnection in the voltage network.

The converter includes a power switch (i.e., one or more power switches) operable for switching at a switching frequency in order for the converter to convert the input power into the output power. The switching frequency decreases in response to a voltage transient being transferred at the power switch due to the transitory disconnection in the voltage network. The controller is operable to detect the transitory disconnection by detecting the switching frequency decreasing below a pre-defined threshold.

The controller may vary the pre-defined threshold depending on a voltage level of the battery and/or a temperature of an environment of the converter.

The controller may vary the pre-defined threshold depending on the input power. The controller may further vary the pre-defined threshold depending on the output power when the input power is less than a pre-defined power threshold.

The converter may be a DC/DC converter. The OBC may be on-board an EV in which case the battery is a traction battery of the EV and the voltage network is a high-voltage (HV) network.

Also, in carrying out at least one of the above and/or other objects, a system for charging a traction battery of an EV is provided. The system includes a voltage network (e.g., a HV network) connected to the traction battery. The system further includes an OBC having a DC/DC converter and a controller. The DC/DC converter has an output port that is connected to the voltage network. The DC/DC converter is operable for converting an input power into an output power and for outputting the output power at the output port onto the voltage network for charging the traction battery. The controller is operable to, upon detecting a transitory disconnection in the voltage network, control the DC/DC converter to stop converting the input power into the output power.

The stoppage of the DC/DC converter is to occur prior to a corresponding reconnection in the voltage network.

The controller is operable to detect the transitory disconnection by detecting a switching frequency of power switches of the DC/DC converter decreasing below a pre-defined threshold as a result of the switching frequency decreasing due to effects of the transitory disconnection.

Further, in carrying out at least one of the above and/or other objects, a method for operating an OBC is provided. The OBC includes a converter having an output port that is connected to a battery via a voltage network. The method includes controlling the converter to convert an input power into an output power and to output the output power at the output port onto the voltage network for charging the battery. The method further includes, upon detecting a transitory disconnection in the voltage network, controlling the converter to stop converting the input power into the output power.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
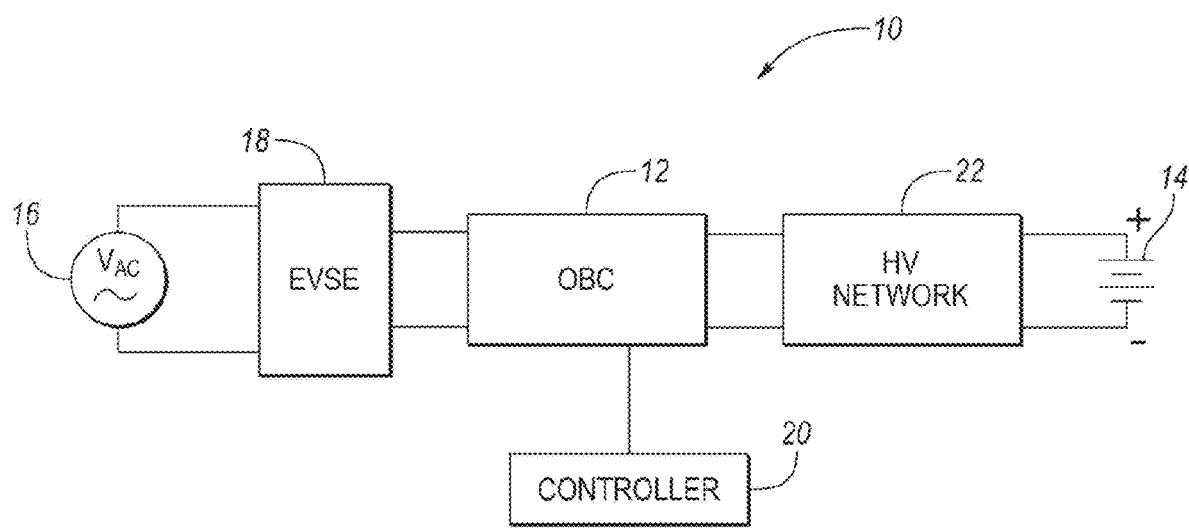
FIG. 1 illustrates a block diagram of an electrical system having a mains supply, Electric Vehicle Supply Equipment (EVSE), an on-board battery charger (OBC), a voltage network, and a battery, the OBC being connected at an input side to the mains supply via the EVSE and being connected at an output side to the battery via the voltage network, the OBC being associated with a controller.

Referring now to FIG. 1, a block diagram of an electrical system 10 having an on-board battery charger (OBC) 12 is shown. OBC 12 is "on-board" an electric vehicle (EV). The terms "electric vehicle" and "EV" herein encompass any type of vehicle which uses electrical power for vehicle propulsion including battery-only electric vehicles (BEV), hybrid electric vehicles (HEV), plug-in hybrid electric vehicles (PHEV), and the like.

OBC 12 is used for charging a traction battery 14 of the EV. Traction battery 14 is a high-voltage (HV) direct current (DC) traction battery per electrical energy requirements for vehicle propulsion. OBC 12 is connected to traction battery 14 via a fly network 22 (e.g., a Hy DC bus of the EV).

Electrical system 10 further includes an alternating current (AC) power source such as a mains supply 16 of the electrical grid. OBC 12 charges traction battery 14 via HV network 22 using electrical power from mains supply 16. OBC 12 connects to mains supply 16 via an external Electric Vehicle Supply Equipment (EVSE) 18 to absorb electrical power from the mains supply. OBC 12 converts electrical power absorbed from mains supply 16 into DC electrical power. OBC 12 outputs the DC electrical power onto HV network 22 for charging traction battery 14.

A controller 20 is associated with OBC 12. Controller 20 is an electronic device such as a processor, micro-controller, or the like (e.g., a computer) on-board the EV (e.g., a vehicle controller). Controller 20 is in communication with OBC 12 to control operations of the OBC. Controller 20 controls OBC 12 in converting electrical power from mains supply 16 into DC electrical power and in charging traction battery 14 with the DC electrical power. For example, controller 20 appropriately controls switching and switching duration of power switches of OBC 12 used for converting electrical power from mains supply 16 into a selected amount of DC electrical power. Controller 20 may be integrated inside the OBC unit. Controller 20 may be operable to communicate and control other nodes of electrical system 10 and the EV including nodes involved in the charging applications.

Figure 2:
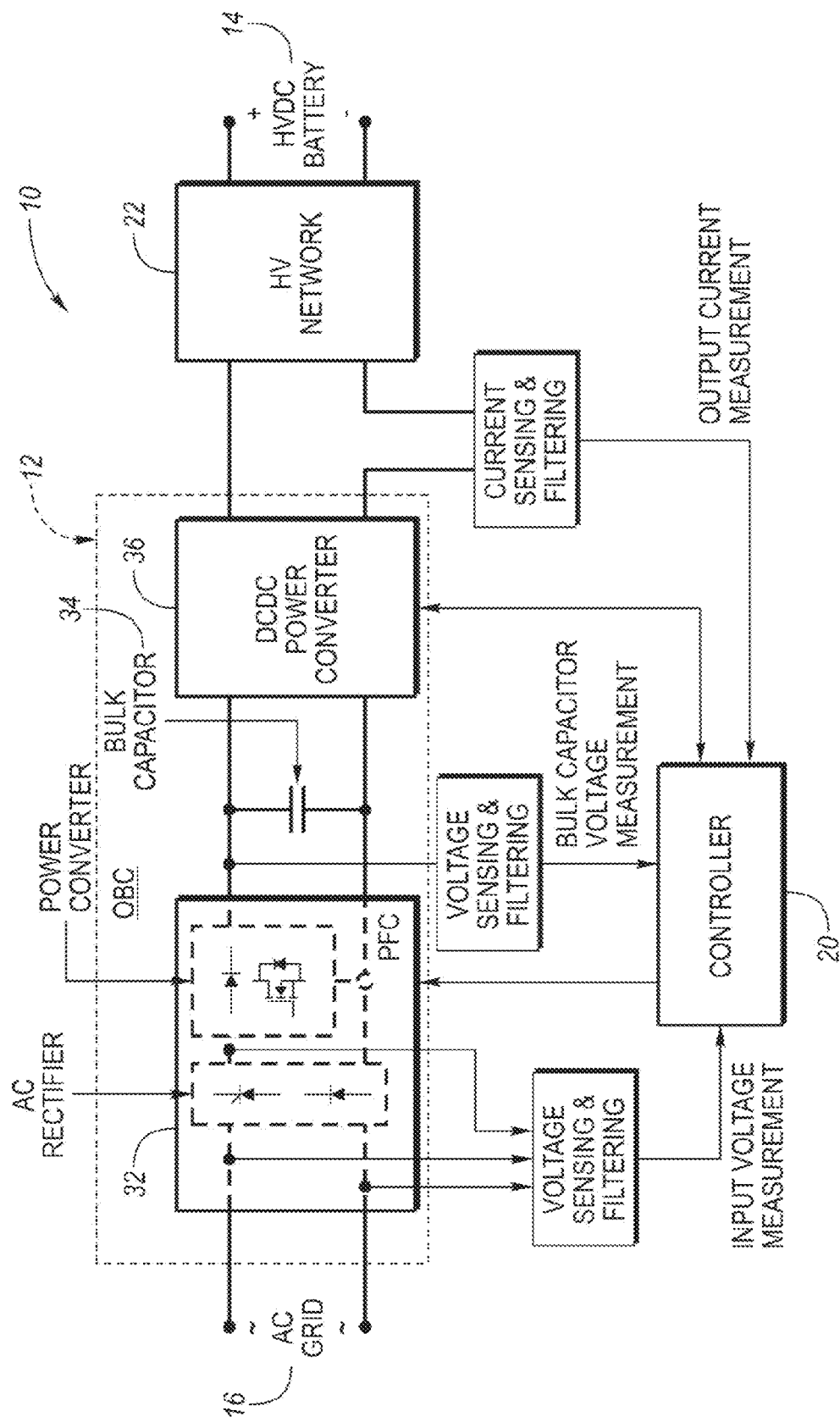
FIG. 2 illustrates a detailed block diagram of the OBC and block diagram depictions of functions of the controller in monitoring and controlling the OBC.

Referring now to FIG. 2, with continual reference to FIG. 1, a detailed block diagram of OBC 12 and block diagrams of functions of controller 20 in monitoring and controlling the OBC are shown.

OBC 12 includes a power factor corrector (PFC) 32, a DC link capacitor (or bulk capacitor) 34, and a DC/DC power converter 36. As shown in FIG. 2, PFC 32 includes an AC rectifier and a power converter. OBC 12 further includes an AC EMI input filter (not shown) between AC grid 16 and an input side of PFC 32 and a DC EMI filter (not shown) between the output side of DC/DC power converter 36 and voltage network 22.

OBC 12 is based on two cascaded power conversion stages. Namely, a power factor correction stage to which PFC 32 belongs and a DC/DC conversion stage to which DC/DC power converter 36 belongs. PFC 32 and DC/DC power converter 36 are connected through a capacitive energy buffer, i.e., DC link capacitor 34. PFC 32 is connectable to mains supply 16 via an EVSE. In this way, an input side of OBC 12 is connectable to mains supply 16 via the EVSE. DC/DC power converter 36 is connected to traction battery 14 via voltage network 22. In this way, an output side of DC/DC power converter 36 is connected to traction battery ("HV DC BATTERY") 14 via voltage network ("HV Network") 22.

In general, PFC 32 handles AC/DC conversion and is controlled by controller 20 to ensure a high-power factor at the input to DC/DC power converter 36. DC/DC power converter 36 is controlled by controller 20 to convert a high-voltage stabilized input at DC link capacitor 34 into a DC battery level for traction battery 14. In this regard, DC/DC power converter 36 adapts the output voltage/current to the requirements of traction battery 14. In sum, PFC 32 functions as the grid front end and DC/DC power converter 36 adapts the output to the range of traction battery 14.

More particularly, PFC 32 converts AC electrical power received from mains supply 16 into DC electrical power and delivers the DC electrical power to DC link capacitor 34 while keeping a power factor close to unity. PFC 32 is controlled so that the voltage of DC link capacitor 34 is regulated at a desired DC voltage level. The voltage of DC link capacitor 34 is the input voltage of DC/DC power converter 36.

DC/DC power converter 36 converts the input voltage to a higher/lower DC voltage level according to the charge status of traction battery 14. This DC voltage level is the output voltage of DC/DC power converter 36. Traction battery 14 is charged via voltage network 22 with DC output current from DC/DC power converter 36 to the output voltage of the DC/DC power converter.

OBC 12 is shown in FIG. 2 as having just one set of PFC 32, DC link capacitor 34, and DC/DC power converter 36. OBC 12 may include additional sets of PFC 32, DC link capacitor 34, and DC/DC power converter 36 arranged in parallel. In an embodiment, OBC 12 includes three sets of PFC 32, DC link capacitor 34, and DC/DC power converter 36 arranged in parallel. This embodiment is useful when mains supply 16 is a three-phase mains supply.

Controller 20 is in communication with PFC 32 to control operations of the PFC. For instance, controller 20 controls PFC 32 in converting AC electrical power from main supply 16 into DC electrical power and delivering the DC electrical power to DC link capacitor 34. In this regard, controller 20 appropriately controls the switching and switching duration of power transistor switches (schematically shown in FIG. 2) of PFC 32 to control the power factor correction provided by the PFC and the operation of the PFC in delivering a selected amount of DC electrical power, converted from the AC electrical power of mains supply 16, to DC link capacitor 34. In this way, DC link capacitor 34 is regulated at the desired DC voltage level.

Controller 20 is in communication with DC/DC power converter 36 to control operations of the DC/DC converter. For instance, controller 20 controls DC/DC power converter 36 in converting the DC input voltage from DC link capacitor 34 to a higher (or lower) DC output voltage for charging traction battery 14. In this regard, controller 20 appropriately controls the switching and switching duration of power transistor switches (not shown) of DC/DC power converter 36 for the DC/DC power converter to convert the input voltage into a higher (or lower) output voltage. Controller 20 is also operable to communicate and control other nodes of the vehicle including nodes involved in the charging applications.

In general, controller 20 may manage both power conversion stages of OBC 12 with measurements of the AC input voltage of PFC 32, the AC input current of PFC 32, the DC voltage of DC link capacitor 34, and/or the DC output current of DC/DC power converter 36. The AC input voltage can be measured, on one hand, in differential mode prior to an AC rectifier of PFC 32 or in bridgeless PFC topologies or, on the other hand, after the AC rectifier.

Figure 3:
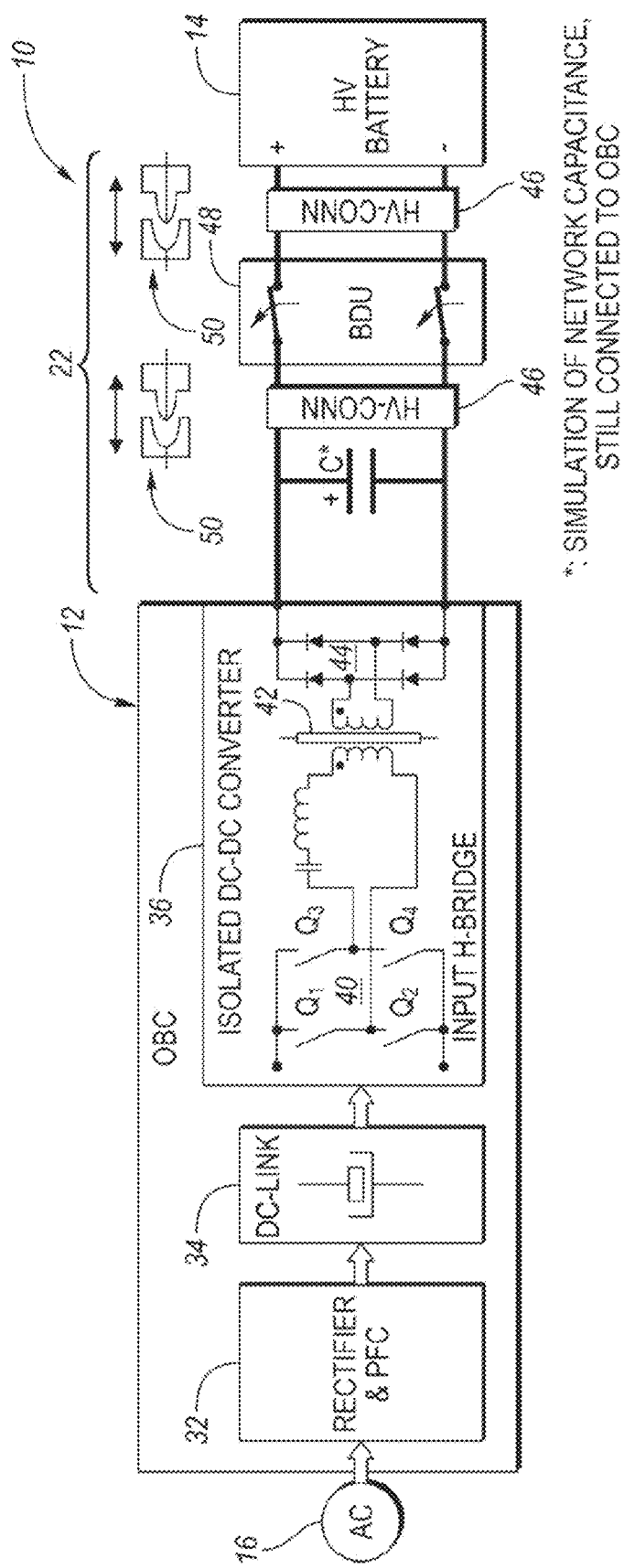
FIG. 3 illustrates another detailed block diagram of the OBC and a detailed block diagram of the voltage network.

Referring now to FIG. 3, with continual reference to FIGS. 1 and 2, another detailed block diagram of OBC 12 and a detailed block diagram of voltage network 22 are shown. The detailed block diagram of OBC 12 in FIG. 3 also shows PFC 32, DC link capacitor 34, and DC/DC power converter 36 of the OBC. This detailed block diagram further illustrates the components of DC/DC power converter 36. As shown, DC/DC power converter 36 includes: a primary bridge of power switches ($Q_1$, $Q_2$, $Q_3$, $Q_4$), generally designated with reference numeral 40, at the input side of the DC/DC power converter; a secondary bridge of diodes, generally designated with reference numeral 44, at the output side of the DC/DC power converter; and a transformer 42 having a primary side connected to the primary bridge of power switches 40 and a secondary side connected to the secondary bridge of diodes 44.

As shown in the detailed block diagram of voltage network 22, voltage network 22 includes a "high-voltage" (HV) wiring infrastructure 45 and a battery disconnect unit (BDU) 48. BDU 48 is connected by wiring infrastructure 45 to the output side of OBC 12 and to traction battery 14. BDU 46 is a switch operable between opened and closed positions. When wiring infrastructure 45 has full continuity and when BDU 46 is switched closed, OBC 12 is connected to traction battery 14.

Wiring infrastructure 45 has one or more pairs of "high-voltage" (HV) connectors 46 (two connectors 46 shown for example). Each pair of connectors 46 forms a connection point in wiring infrastructure 45. Each pair of connectors 46 is to be properly connected for wiring infrastructure 45 to have full continuity between OBC 12 and traction battery 14.

An issue is when a pair of connectors 46 has a loose connection 50. Two different possibilities of loose connections 50 are depicted in FIG. 3 with respective legends. As indicated in FIG. 3, each possibility of loose connection 50 is associated with a respective pair of connectors 46. Loose connection 50 is a transitory contact loss (i.e., a transitory disconnection) in voltage network 22. As such, transitory disconnection 50 represents a disconnection anomalous event. As transitory disconnection 50 is "transitory", transitory disconnection 50 has an associated remedial reconnection (i.e., a reconnection anomalous event) which subsequently occurs.

Transitory disconnection 50 is an issue because transitory disconnection 50 occurring while OBC 12 is charging traction battery 14 may cause unexpected voltage transients. Such voltage transients are transferred at the primary bridge of power switches 40 of DC/DC power converter 36 of OBC 12 as unexpected output behavior. Consequently, power switches 40 handle energy flow with undesired operating conditions. This flow desynchronization causes electrical overstress and eventually one or more of power switches 40 might become damaged. A voltage control loop of OBC 12 is too slow to provide a rectifying reaction and is a relatively expensive upgrade. Further, such unexpected voltage transients may occur when there is a transitory disconnection 50 while traction battery 14 is disconnected by BDU 48 from OBC 12.

In accordance with embodiments of the present invention, controller 20 is operable for controlling the operation of OBC 12 to protect the OBC against transitory disconnections 50 in voltage network 22. In general, in case of a transitory disconnection 50 in voltage network 22, controller 20 switches OBC 12 off. In this regard, controller 20 is operable to detect the occurrence of transitory disconnection 50. By OBC 12 being switched off, the operation of DC/DC power converter 36 in converting input power into output power is stopped. Further, in switching OBC 12 off in response to transitory disconnection 50, controller 20 switches the OBC off in time prior to the reconnection anomalous event.

In order for DC/DC power converter 36 to convert input power into output power, power switches 40 of the DC/DC power converter switch on/off at a corresponding switching frequency. The switching frequency decreases in response to a voltage transient being transferred at power switches 40 due to transitory disconnection 50 in voltage network 22. Controller 20 monitors the switching frequency and detects the presence of transitory disconnection 50 by detecting a decrease of the switching frequency of power switches 40 below a pre-defined frequency threshold. As such, upon the switching frequency of power switches 40 dropping below the pre-defined frequency threshold (which is caused by the presence of transitory disconnection 50), controller 20 stops the operation of OBC 12.

Controller 20 may vary the pre-defined frequency threshold depending on a voltage level of traction battery 14 and/or a temperature of an environment of OBC 12 and/or DC/DC power converter 36.

Figure 4:
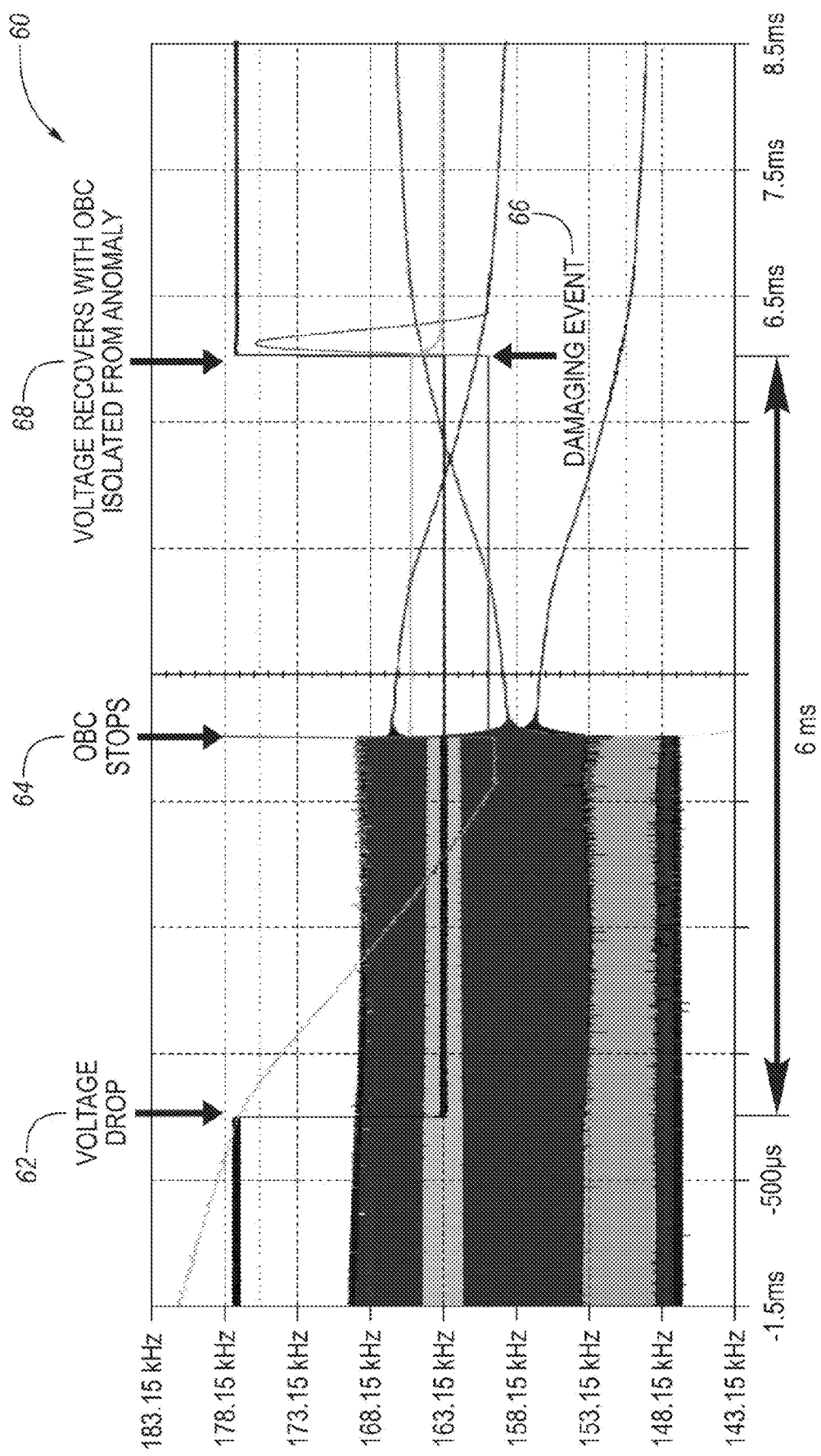
FIG. 4 illustrates a graph having plots associated with the operation of the OBC as a function of switching frequency of power switches of a DC/DC power converter of the OBC versus time according to experimental results.

Referring now to FIG. 4, with continual reference to FIGS. 2 and 3, a graph 60 having plots associated with the operation of OBC 12 as a function of switching frequency of power switches 40 of DC/DC power converter 36 versus time according to experimental results is shown. In embodiments of the present invention, with reference to FIGS. 2, 3, and 4, a fast control loop of controller 20 measures the output current of OBC 12 and the switching frequency of power switches 40. Subsequently, in operation, a transitory disconnection event occurs. This transitory disconnection 50 causes a voltage transient, indicated in FIG. 4 by "Voltage drop" labeled reference line 62. As this transitory disconnection anomaly evolves, the switching frequency of power switches 40 decreases. For instance, a control system of DC/DC power converter decreases the switching frequency of power switches 40. Controller 20 is able to identify the decreased switching frequency of power switches 40 and, upon the switching frequency decreasing below a pre-defined switching frequency threshold, stops the charging operation of OBC 12, indicated in FIG. 4 by "OBC stops" labeled reference line 64.

After the charging operation of OBC 12 has been stopped, the reconnection anomalous event associated with transitory disconnection 50 subsequently occurs, indicated in FIG. 4 by "Damaging event" labeled reference line 66. The voltage of voltage network 22 recovers due to the reconnection event with the OBC 12 being isolated from the reconnection event as the charging operation of OBC 12 was stopped prior to the reconnection event, indicated in FIG. 4 by "Voltage recovers with OBC isolated from anomaly" labeled reference line 68.

As noted, the frequency threshold varies with the voltage level of traction battery 14 and the temperature of the environment of OBC 12. In this regard, controller 20 is associated with corresponding measurement devices such as a voltage sensor for monitoring the voltage level of traction battery 14 and a temperature sensor for monitoring the temperature of the environment of OBC 12.

Figure 5:
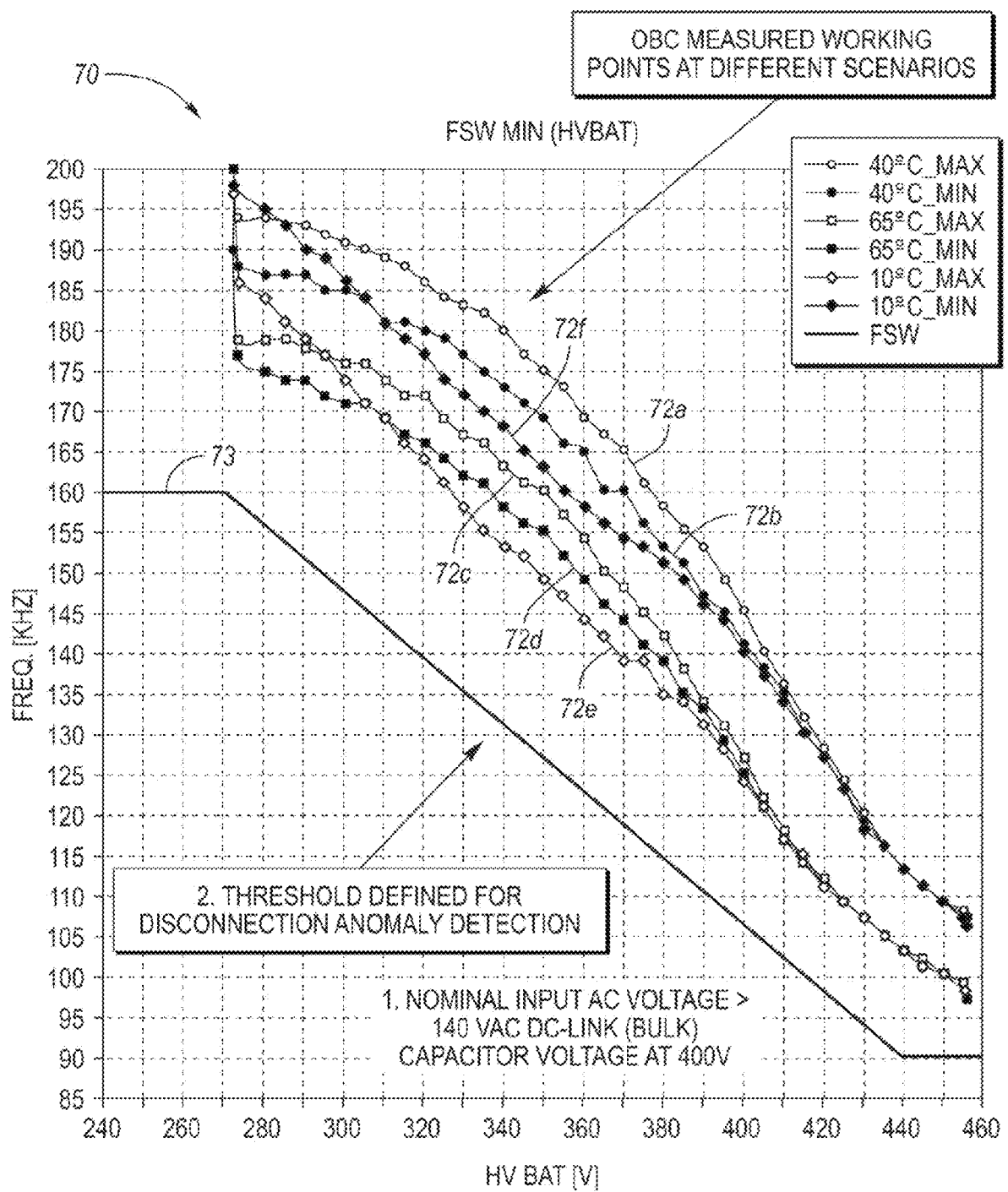
FIG. 5 illustrates a graph having different plots of pre-defined switching frequency thresholds, for different temperatures of the environment of the OBC, depicting their variation as a function of switching frequency of the power switches versus the voltage level of the battery, the graph further having a plot of an alternative pre-defined switching frequency threshold depicting its variation as a function switching frequency of the power switches versus the voltage level of the traction battery, the existence of this alternative pre-defined switching frequency threshold depending on an input AC nominal voltage being greater than a pre-defined voltage threshold.

FIG. 5 illustrates a graph 70 having different plots 72a, 72b, 72c, 72d, 72e, and 72f of pre-defined switching frequency thresholds, for different temperatures of the environment of OBC 12, depicting their variation as a function of switching frequency of power switches 40 versus the voltage level of traction battery 14. As indicated in FIG. 5, plots 72a, 72b, 72c, 72d, 72e, and 72f of pre-defined switching frequency thresholds versus the voltage level of traction battery 14 are OBC measured working points at different (temperature) scenarios.

In accordance with other embodiments of the present invention, graph 70 further includes a plot 73 of an alternative pre-defined switching frequency threshold depicting its variation as a function switching frequency of power switches 40 versus the voltage level of traction battery 14. The existence of switching frequency threshold 73 depends on the input AC nominal voltage being greater than a pre-defined voltage threshold, such as 140 VAC as indicated in FIG. 5. The existence of switching frequency threshold 73 may further depend on DC link capacitor 34 being regulated at a desired DC voltage level, such as 400 VDC as indicated in FIG. 5.

Figure 6:
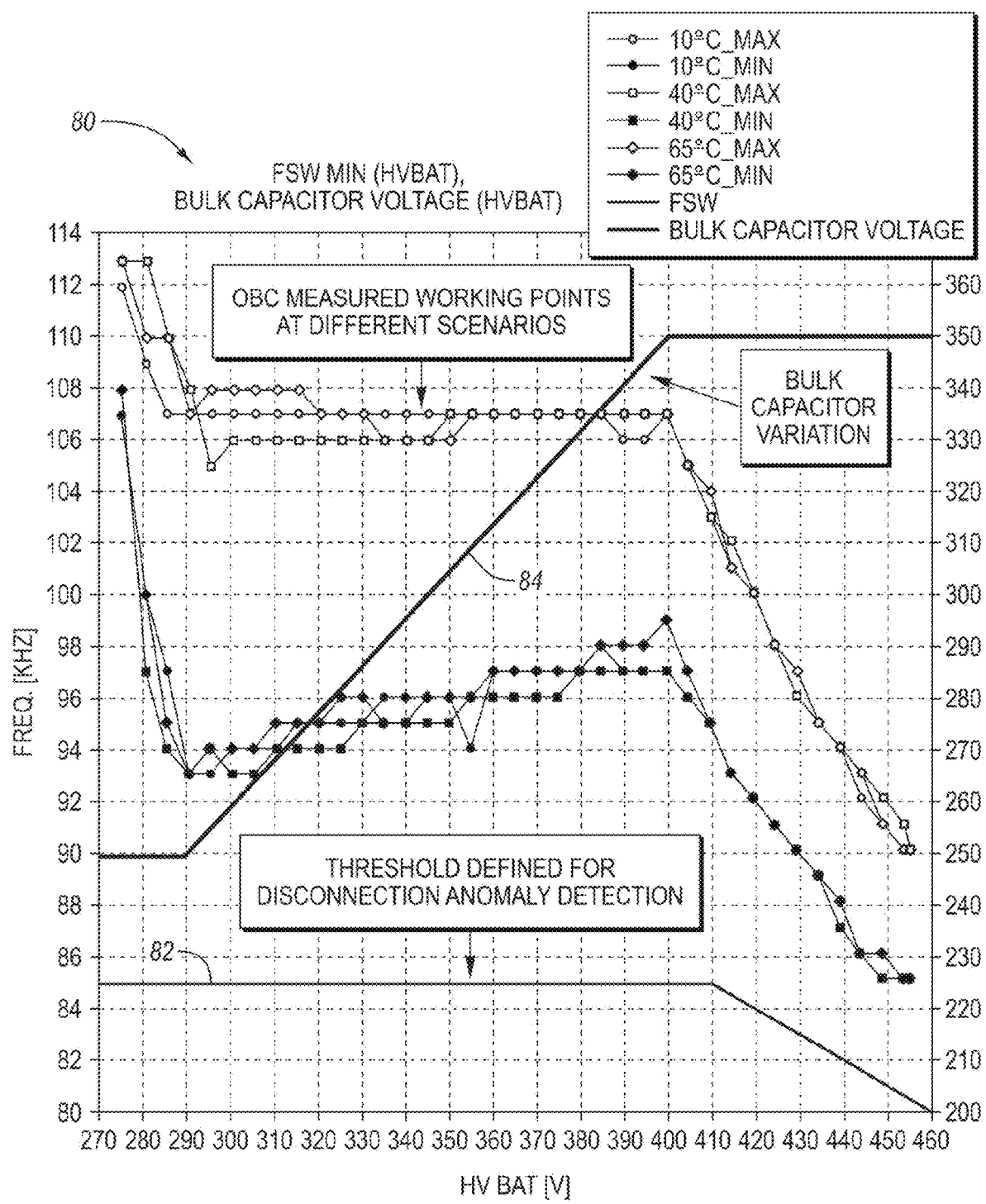
FIG. 6 illustrates a graph having a plot of an alternative second pre-defined switching frequency threshold depicting its variation as a function switching frequency of the power switches versus the voltage level of the traction battery and a plot of a variation of the voltage of a DC link capacitor.

In accordance with the other embodiments of the present invention, referring now to FIG. 6, a graph 80 having a plot 82 of an alternative second pre-defined switching frequency threshold depicting its variation as a function switching frequency of power switches 40 versus the voltage level of traction battery 14 is shown. The existence of switching frequency threshold 82 depends on the input AC nominal voltage being less than the pre-defined voltage threshold, such as 140 VAC.

Graph 80 further includes a plot 84 of a variation of the voltage of DC link capacitor 34. When the input AC nominal voltage is less than the pre-defined voltage threshold, the operation of controller 20 includes adapting the voltage of DC link capacitor 34 to the input AC supply voltage. This leads to a constant threshold value for switching frequency threshold 82 during most of the voltage variation range of traction battery 14, as depicted in graph 80. In operation, controller 20 periodically samples, such as on the order of two seconds, the voltage of traction battery 14. Controller 20 averages a set of the samples, such as every four samples, to calculate the threshold value to select and to use in anomaly detection algorithm. (It is noted that the operation, like typical electrical systems, may have a start-up process where the traction battery voltage measurements by controller 20 are done in a different way (to avoid confusing indications) until operation stability is reached (or to assure fast convergence into operation stability.)

As described, a brief description of embodiments of the present invention includes detecting a transitory disconnection 50 in voltage network 22 by detecting switching frequency decrease of power switches 40 of DC/DC power converter 36 below a pre-defined threshold and, in response, switching off the charging operation of OBC 12. The pre-defined threshold varies with voltage of traction battery 14 and with the temperature of the environment of OBC 12. The switching frequency is monitored by controller 20, for example, acting as a DC/DC primary control system. As the switching off of the charging operation of OBC 12 is to occur fast enough to be prior to the reconnection event associated with transitory disconnection 50, a voltage sensing loop is not practical to use (either too slow or relatively too expensive to upgrade).

A problem solved by embodiments of the present invention is avoiding a transitory reconnection event while the charging operation of OBC 12 is not switched off. A transitory reconnection event occurring while the charging operation of OBC 12 is not switched off causes power switches 40 to work in undesired operating conditions. This means an overstress that may eventually damage one or more of power switches 40. The solution provided by embodiments of the present invention may be employed as a software update to controller 20.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. An on-board battery charger (OBC), comprising:
a converter comprising an output port connectable to a battery via a voltage network, the converter configured to convert an input power into an output power and output the output power at the output port onto the voltage network for charging the battery; and
a controller configured to, upon detecting a transitory disconnection in the voltage network based on determining a switching frequency of the converter is below a pre-defined threshold, control the converter to stop converting the input power into the output power.

2. The OBC of claim 1, wherein
in controlling the converter to stop converting the input power into the output power, the controller stops operation of the converter prior to a corresponding reconnection in the voltage network.

3. The OBC of claim 1, wherein
the converter further comprises a power switch configured to switch at the switching frequency in order for the converter to convert the input power into the output power, and wherein the switching frequency decreases in response to a voltage transient being transferred at the power switch due to the transitory disconnection in the voltage network.

4. The OBC of claim 3, wherein
the controller is further configured to vary the pre-defined threshold depending on at least one of a voltage level of the battery and a temperature of an environment of the converter.

5. The OBC of claim 3, wherein
the controller is further configured to vary the pre-defined threshold depending on the input power.

6. The OBC of claim 3, wherein
the controller is further configured to vary the pre-defined threshold depending on the output power when the input power is less than a pre-defined power threshold.

7. The OBC of claim 1, wherein
the OBC is on-board an electric vehicle and the battery is a traction battery of the electric vehicle.

8. A system for charging a traction battery of an electric vehicle, comprising:
a voltage network connected to the traction battery; and
an on-board battery charger (OBC) including a DC/DC converter and a controller, the DC/DC converter comprising an output port that is connected to the voltage network, the DC/DC converter is configured to convert an input power into an output power and output the output power at the output port onto the voltage network for charging the traction battery, the controller is configured to, upon detecting a transitory disconnection in the voltage network based on determining a switching frequency of the DC/DC converter is below a pre-defined threshold, control the DC/DC converter to stop converting the input power into the output power.

9. The system of claim 8, wherein in controlling the DC/DC converter to stop converting the input power into the output power, the controller is further configured to stop operation of the DC/DC converter prior to a corresponding reconnection in the voltage network.

10. The system of claim 8, wherein the DC/DC converter further comprises a plurality of power switches configured to switch at the switching frequency in order for the DC/DC converter to convert the input power into the output power, and wherein the switching frequency decreases in response to a voltage transient being transferred at the plurality of power switches due to the transitory disconnection in the voltage network.

11. The system of claim 10, wherein the controller is further configured to vary the pre-defined threshold depending on at least one of a voltage level of the traction battery and a temperature of an environment of the DC/DC converter.

12. The system of claim 10, wherein the controller is further configured to vary the pre-defined threshold depending on the input power.

13. A method for operating an on-board battery charger (OBC), the OBC including a converter comprising an output port that is connected to a battery via a voltage network, the method comprising:

controlling the converter to convert an input power into an output power and to output the output power at the output port onto the voltage network for charging the battery; and upon detecting a transitory disconnection in the voltage network based on determining a switching frequency of the converter is below a pre-defined threshold, controlling the converter to stop converting the input power into the output power.

14. The method of claim 13, wherein controlling the converter to stop converting the input power into the output power comprises stopping operation of the converter prior to a corresponding reconnection in the voltage network.

15. The method of claim 13, wherein the converter further comprises a power switch configured to switch at the switching frequency in order for the converter to convert the input power into the output power, and wherein the switching frequency decreases in response to a voltage transient being transferred at the power switch due to the transitory disconnection in the voltage network, the method further comprising monitoring the switching frequency of the power switch.

16. The method of claim 15, further comprising varying the pre-defined threshold depending on a voltage level of the battery.

17. The method of claim 15, further comprising varying the pre-defined threshold depending on a temperature of an environment of the converter.

18. The method of claim 13, further comprising varying the pre-defined threshold depending on the input power.

19. The method of claim 18, further comprising varying the pre-defined threshold depending on the output power when the input power is less than the pre-defined power threshold.

20. The method of claim 13, wherein the OBC is on-board an electric vehicle and the battery is a traction battery of the electric vehicle.

* * * * *